United States Patent Office 2,706,648
Patented Apr. 19, 1955

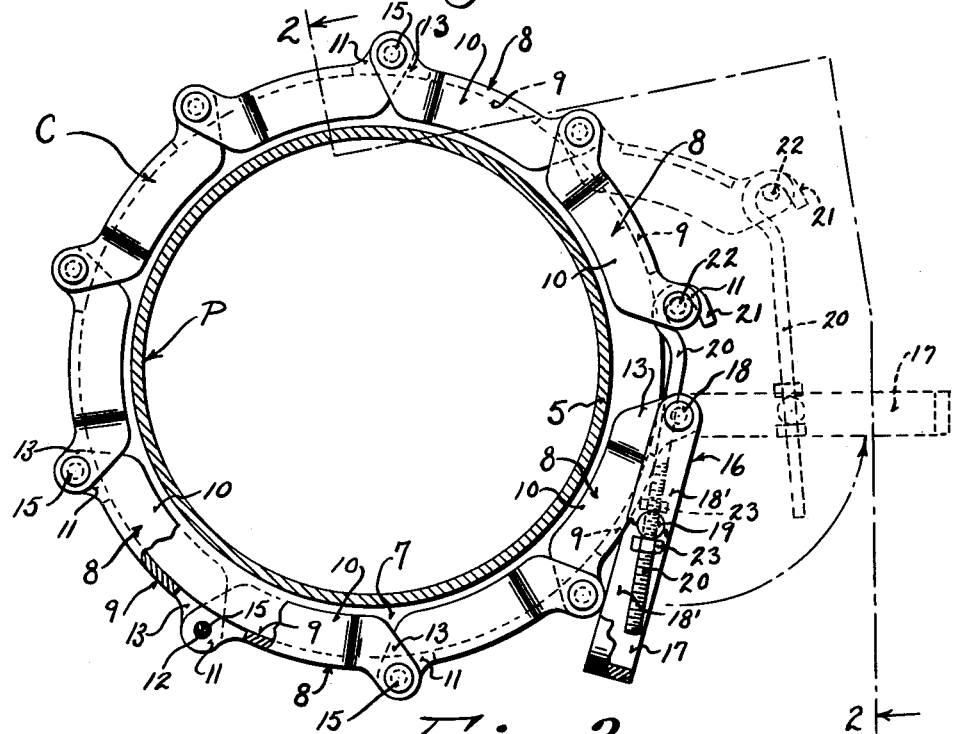
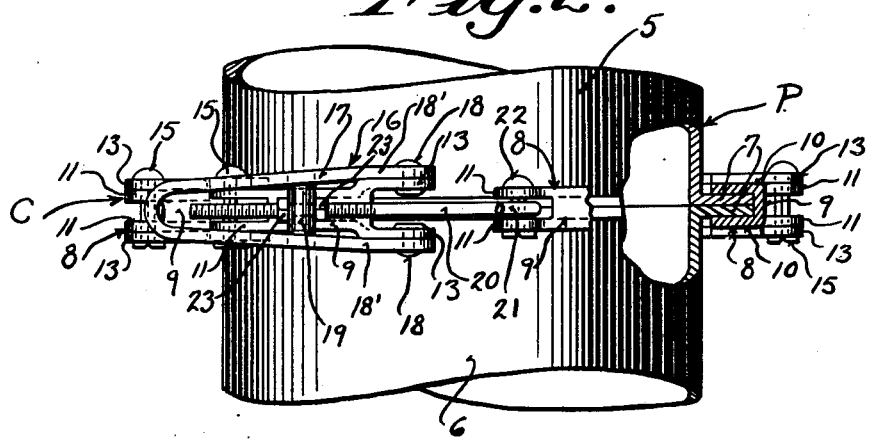
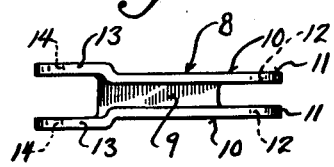

2,706,648

PIPE CLAMP

Herbert O. Gosse, Glenbeulah, Wis., assignor to Knowles Manufacturing Co., Glenbeulah, Wis.

Application September 2, 1949, Serial No. 113,837

1 Claim. (Cl. 285—129)

This invention appertains to pipe couplings and more particularly to a clamp for detachably connecting sections of crop blower pipes together.

In pneumatic conveyor or crop blower pipes, the same usually include a plurality of sections having abutting flanges. The flanges are connected by a series of bolts. Much difficulty is had in assembling the sections and time and care is consumed when it becomes necessary to add or remove sections from the pipe.

It is, therefore, one of the primary objects of my invention to provide a novel unitary adjustable clamp for embracing the flanges of adjacent pipe sections for quickly and efficiently connecting said sections together by the mere manipulation of a single throw lever.

Another salient object of the invention is to provide a clamp embodying a series of like hingedly connected links of a U-shape in cross section for receiving pipe flanges with a pivoted adjusting lever and draw rod for connecting the end links of the clamp together, so that upon manipulation of the lever in one direction the links can be drawn tight around the pipe flanges.

A further object of the invention is to provide means, whereby the draw rod can be quickly connected to or disconnected from its adjacent end link of the clamp to facilitate the placing of the clamp around the pipe and whereby the active length of the draw rod can be adjusted to take care of varying diameters of pipe within certain limits.

A further important object of the invention is to provide novel means for the clamp, whereby more or less links can be quickly employed for small or large pipe.

A still further object of the invention is to provide a pipe clamp of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing:

Figure 1 is a diametric sectional view through a blower pipe showing the novel clamp in position for connecting a pair of adjacent pipe sections together, the clamp being shown in end elevation with parts thereof broken away and in section to illustrate structural detail.

Figure 2 is a fragmentary top plan view showing the clamp in use for coupling a pair of adjacent pipe sections together, parts of the clamp and pipe sections being shown in section, the section being taken on the line 2—2 of Figure 1, looking in the directions of the arrows.

Figure 3 is a detail inner face view of one of the novel links employed in the clamp.

Referring to the drawing in detail, wherein similar reference characters designate corresponding parts throughout the several views, the letter C generally indicates the novel clamp for coupling a pair of sections 5 and 6 of a blower pipe P together.

As illustrated, the adjacent ends of the pipe sections 5 and 6 are each provided with outwardly extending annular flanges 7. In ordinary practice, these flanges usually are provided with bolt holes and bolts are utilized for connecting the flanges together.

In accordance with this invention, the clamp C is utilized for firmly and quickly uniting the sections together without the employment of bolts.

The clamp C comprises a plurality of like arcuate links 8. Each link is of a substantially U-shape in cross section and includes a body having an arcuate outer wall 9, and spaced parallel side walls 10. This body is of such a shape as to readily receive and embrace abutting pipe flanges 7, as can be seen by referring to Figures 1 and 2. The side walls 10 are extended at one end of each link and are angled outwardly to provide spaced pivot ears 11. The ears are provided with aligned openings 12. The opposite end of each link from the ears 11 is likewise provided with outwardly extending spaced pivot ears 13, and these ears are provided with aligned openings 14. It is to be noted that the ears 13 are bent laterally from the side walls 10, so as to provide adequate spacing for receiving ears 11, of an adjacent link.

In assembling the clamp, the ears 11, as intimated, are placed between ears 13 of an adjacent link and a detachable pivot pin 15 is passed through the openings 12 and 14 of the ears 11 and 13 of adjacent links. The pivot pins 15 may merely consist of cotter pins which will facilitate quick removal and insertion. More or fewer links 8 can be utilized in the clamp according to the size of the pipe sections to be united, and in view of the cotter pins utilized links can be readily added to or removed from the clamp as necessary.

Novel means 16 is utilized for expanding and contracting the clamp around the pipe and as illustrated, a hand lever 17 is employed and this lever is pivotally connected, such as by rivets 18, with the ears 13 of one end link. This lever is preferably formed from strap material bent into a U-shape to provide spaced parallel legs 18' for embracing the outer faces of the ears 13. The legs 18' at a point intermediate their ends rockably carry a cross rod or bearing 19 having a centrally disposed diametrically extending opening. Slidable through the cross rod or bearing 19, is a draw or pull rod 20. One end of the rod 20 is provided with a hook 21 for detachable connection with a cotter pin 22 carried by the ears 11 of the opposite end link of the clamp. The rod is provided with threads and nuts 23 are adjustable on the rod toward and away from the bearing 19 so that the active length of this rod can be changed to correspond with varying diameters of pipe.

In use of the clamp, the desired number of links 8 are assembled by connecting the same together with the cotter pins 15, and the clamp is placed around the abutting flanges 7, with the flanges resting between the side walls 10 of each link. After the links are brought around the pipe the hook 21 is placed over the cotter pin 22, as shown in dotted lines in Figure 1. The lever 17 is now swung in a clockwise direction toward the clamp and the rod 20 will swing between the legs 18' of the lever and the adjacent ends of the clamp will be brought toward one another and the links tight around the pipe. Obviously, to disengage the clamp it is merely necessary to swing the lever 17 in a counter-clockwise direction, as shown by the arrow in Figure 1.

From the foregoing description it can be seen that I have provided an exceptionally simple and durable form of clamp for connecting the adjacent ends of pipes together.

Changes in details may be made without departing from the spirit or the scope of this invention, but what I claim as new is:

A coupling clamp for releasably locking the adjacent ends of the sections of a crop blower pipe together comprising an open band, said band including a series of like arcuate links of a U-shape in cross section, each link having a pair of outwardly extending pivot ears on one end and a second pair of outwardly extending pivot ears on the opposite end, said second pair of pivot ears being of a size and configuration to receive the first pair of pivot ears of an adjacent link, means pivotally and detachably connecting the links together, and means for moving and locking the end links of the band toward one another, said means including a U-shaped lever having a pair of spaced legs straddling the pivot ears of one end link, means pivotally connecting the lever to the ears, a rock bearing carried between said legs intermediate the respective ends of the lever, said bearing having a diametrically extending opening therethrough, a draw rod slidable through the opening, means for adjusting the rod in the rock bearing, said means including a pair of spaced nuts threaded on said draw rod on either side of the rock bearing, and a hook on the outer end of said rod for detachable connection with the other end link of the band.

References Cited in the file of this patent

UNITED STATES PATENTS

| Number | Name | Date |
|---|---|---|
| 627,987 | Dick | July 4, 1899 |
| 639,342 | Belmont | Dec. 19, 1899 |
| 815,558 | Rosier | Mar. 20, 1906 |
| 1,185,487 | Eastman | May 30, 1916 |
| 1,290,590 | Lehew | Jan. 7, 1919 |
| 2,178,819 | Timm | Nov. 7, 1939 |
| 2,302,475 | Richards | Nov. 17, 1942 |
| 2,482,374 | Ruschmeyer | Sept. 20, 1949 |
| 2,489,535 | Montague | Nov. 29, 1949 |

FOREIGN PATENTS

| Number | Country | Date |
|---|---|---|
| 7,180 | France | Mar. 27, 1907 |
| | (Addition to No. 363,083) | |